United States Patent
Sasaki

(10) Patent No.: US 8,161,096 B2
(45) Date of Patent: Apr. 17, 2012

(54) METHOD OF EXECUTING SERVICE ON A NETWORK, AND FLOW PROCESSING APPARATUS WITH DOCUMENT THAT DESCRIBES A FLOW FOR CONTROLLING SERVICES ON THE NETWORK

(75) Inventor: Osamu Sasaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 691 days.

(21) Appl. No.: 12/033,368

(22) Filed: Feb. 19, 2008

(65) Prior Publication Data

US 2008/0201400 A1 Aug. 21, 2008

(30) Foreign Application Priority Data

Feb. 21, 2007 (JP) ................................. 2007-041278
Jan. 30, 2008 (JP) ................................. 2008-019588

(51) Int. Cl.
*G06F 15/16* (2006.01)
*G06F 15/173* (2006.01)

(52) U.S. Cl. ........ 709/201; 709/202; 709/203; 709/204; 709/206; 709/217; 709/218; 709/223; 709/225; 709/227; 709/230; 709/232; 709/249; 709/250

(58) Field of Classification Search .......... 709/201–204, 709/206, 217–218, 223, 225, 227, 230, 232, 709/249, 250
See application file for complete search history.

(56) References Cited

U.S. PATENT DOCUMENTS

| 2004/0015564 | A1* | 1/2004 | Williams ........................ 709/219 |
| 2005/0015491 | A1* | 1/2005 | Koeppel ......................... 709/226 |
| 2005/0267952 | A1* | 12/2005 | Ricciardi et al. ............... 709/220 |
| 2006/0041935 | A1* | 2/2006 | Conley et al. ................... 726/11 |
| 2007/0169042 | A1* | 7/2007 | Janczewski .................... 717/149 |
| 2007/0209042 | A1* | 9/2007 | Mullan et al. .................. 719/328 |
| 2008/0104238 | A1* | 5/2008 | Gilfix et al. .................... 709/225 |

FOREIGN PATENT DOCUMENTS

| JP | 10105623 A * | 4/1998 |
| JP | 2005-173892 | 6/2005 |
| JP | 2005173892 A * | 6/2005 |

* cited by examiner

*Primary Examiner* — Ashok Patel
*Assistant Examiner* — Kevin Bechtel
(74) *Attorney, Agent, or Firm* — Fitzpatrick, Cella, Harper & Scinto

(57) ABSTRACT

A flow processing apparatus generates second and third documents from a first document that describes a flow for executing services, registers the second document in a first apparatus and registers the third document in a second apparatus on the network on which the services exist. The flow processing apparatus then interprets the second document by the first apparatus and calls the second document by the first apparatus, interprets the third document by the second apparatus, which has been called from the first apparatus, and receives result of execution of a called service by the first apparatus.

10 Claims, 10 Drawing Sheets

```
<process name="SampleProcess" >
  <sequence name="main">
    <receive name="receiveInput"
            partnerLink="client"
            portType="pPortType"
            operation="process"
            variable="input"
            createInstance="yes" />
    <invoke name="invoke-1"
            partnerLink="partnerLink1"
            portType="SamplePortType1"
            operation="invoke"
            inputVariable="input1"
            outputVariable="output1" />
    <invoke name="invoke-2"
            partnerLink="partnerLink2"
            portType="SamplePortType2"
            operation="invoke"
            inputVariable="input2"
            outputVariable="output2" />
    <invoke name="invoke-3"
            partnerLink="partnerLink3"
            portType="SamplePortType3"
            operation="invoke"
            inputVariable="input3"
            outputVariable="output3" />
    <reply name="replyOutput"
            partnerLink="client"
            portType="pPortType"
            operation="process"
            variable="output" />
  </sequence>
</process>
```

```
<process name="SampleProcess" >
  <sequence name="main">
    <receive name="receiveInput"
            partnerLink="client"
            portType="pPortType"
            operation="process"
            variable="input"
            createInstance="yes" />
    <invoke name="invoke-1"
            partnerLink="partnerLink1"
            portType="SamplePortType1"
            operation="invoke"
            inputVariable="input1"
            outputVariable="output1" />
    <invoke name="invokeSubProcess"
            partnerLink="subProcessPartnerLink"
            portType="subProcessPortType"
            operation="process"
            inputVariable="input2"
            outputVariable="output3" />
    <reply name="replyOutput"
            partnerLink="client"
            portType="pPortType"
            operation="process"
            variable="output" />
  </sequence>
</process>
```

```
<process name="SampleProcess" >
  <sequence name="main">
    <receive name="receiveInput"
            partnerLink="subProcessPartnerLink"
            portType="subProcessPortType"
            operation="process"
            variable="input2"
            createInstance="yes" />
    <invoke name="invoke-2"
            partnerLink="partnerLink2"
            portType="SamplePortType2"
            operation="invoke"
            inputVariable="input2"
            outputVariable="output2" />
    <invoke name="invoke-3"
            partnerLink="partnerLink3"
            portType="SamplePortType3"
            operation="invoke"
            inputVariable="input3"
            outputVariable="output3" />
    <reply name="replyOutput"
            partnerLink="subProcessPartnerLink"
            portType="subProcessPortType"
            operation="process"
            variable="output3" />
  </sequence>
</process>
```

METHOD OF EXECUTING SERVICE ON A NETWORK, AND FLOW PROCESSING APPARATUS WITH DOCUMENT THAT DESCRIBES A FLOW FOR CONTROLLING SERVICES ON THE NETWORK

BACKGROUND OF THE INVENTION

1. Field of the Invention

The present invention relates to a method of executing services on a network and to a flow processing apparatus.

2. Description of the Related Art

In cases where a flow processing apparatus causes a service execution apparatus to execute a plurality of services using a flow description document, the general practice conventionally is to describe the services of the service execution apparatus that has been connected to the same network as that of the flow processing apparatus.

For example, the specification of Japanese Patent Application Laid-Open No. 2005-173892 discloses a service linkage processing system for dividing service linkage processing into a plurality of processes and creating subroutine designation documents of the individual processes and a main routine designation document in which content for controlling the execution of each subroutine designation document is described.

However, in cases where flow processing that utilizes individual services placed on two networks isolated by a firewall is described in a flow description document, the following problem arises:

For example, if a firewall is set up so as to allow communication from a specific address to a specific address and the security level is lowered, the flow processing apparatus may then send a command directly to the service execution apparatus. However, since a setting that lowers security level must be directed to all services placed on the inner side of the firewall, it is necessary to change the firewall settings whenever the flow description document is redefined.

At the time of operation, and in particular, when a new flow description document is executed, it is necessary that the network environment such as the firewall be configured again.

Further, although a protocol (e.g., SMTP) that makes it possible to pass through a firewall can be utilized in communication from the flow processing apparatus to the service execution apparatus, the protocol utilized by the service generally is HTTP. As a consequence the following problem arises:

In a service execution apparatus utilized from a flow processing apparatus, it is necessary to perform a change of settings in such a manner that processing will be capable even with Simple Mail Transfer Protocol (SMTP). When a flow description diagram is executed anew, it is necessary to reconfigure the network environment at the time of operation.

SUMMARY OF THE INVENTION

Accordingly, an object of the present invention is to alleviate the burden involved in configuring a network environment.

According to one aspect of the present invention, a method of executing services on a network, comprises generating second and third documents from a first document that describes a flow for executing services;

registering the second document in a first apparatus;

registering the third document in a second apparatus on the network on which the services exist;

interpreting, at the first apparatus, the second document to call the second apparatus; and receiving, at the first apparatus, an execution result that the third document has been interpreted by the second apparatus called from the first apparatus and the called services have been executed.

According to another aspect of the present invention, a flow processing apparatus comprises a generation unit adapted to generate second and third documents from a first document that describes a flow for executing services;

a first registration unit adapted to register the second document in a first apparatus;

a second registration unit adapted to register the third document in a second apparatus on the network on which the services exist;

a calling unit that the first apparatus interprets the second document and calls the second apparatus; and a reception unit that the first apparatus receives an execution result that the third document has been interpreted by the second apparatus called from the first apparatus and the called services have been executed.

Further features of the present invention will become apparent from the following description of exemplary embodiments with reference to the attached drawings.

BRIEF DESCRIPTION OF THE DRAWINGS

FIG. 8 is a diagram illustrating an example of the flow description document;

FIG. 9 is a diagram illustrating an example of a parent document; and

FIG. 10 is a diagram illustrating an example of a partial document.

DESCRIPTION OF THE EMBODIMENTS

A mode of practicing the present invention will now be described in detail with reference to the drawings.

Figure 1:
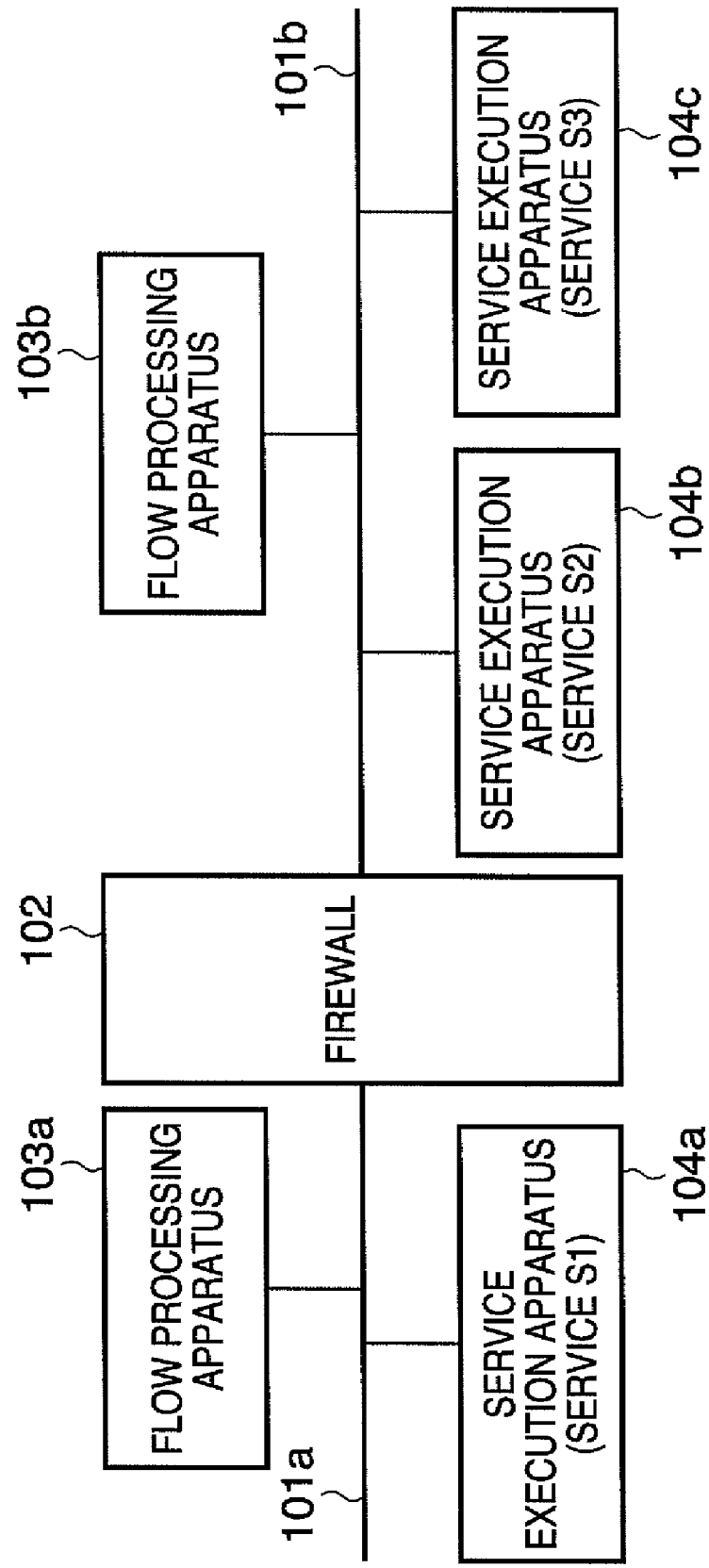
FIG. 1 is a block diagram illustrating an example of the configuration of a flow processing system according to an embodiment of the present invention.

First, reference will be made to FIG. 1 to describe the configuration of a flow processing system that includes a plurality of flow processing apparatuses and a plurality of service execution apparatuses. FIG. 1 is a block diagram illustrating an example of the configuration of the flow processing system according to this embodiment. The units corresponding to the respective blocks shown in FIG. 1 may be implemented by a single computer or, if necessary, it may be so arranged that the functions are implemented by being dispersed among a plurality of computers.

As shown in FIG. 1, a network is divided into two networks, namely networks 101a and 101b, by a firewall 102, described later. In this example, it is assumed that the network 101a is a network external to the firewall 102 and that the network 101b is a network on the inner side of the firewall 102. The firewall 102 controls communication between the internal network 101b and external network 101a, and maintains the security of the internal network 101b. A detailed description of the firewall 102 will not be given here.

Flow processing apparatuses 103a and 103b interpret and execute a flow description document. A flow description document is a document in which service linkage such as Services Business Process Execution Language (WS-BPEL) is described in an executable format.

Service execution apparatuses 104a, 104b and 104c execute various services such as printing, storage, image capture and image conversion as Web services on a network and provide the flow processing apparatuses 103a, 103b with the results of execution.

The subscripts "b" and "c" are appended to the units connected to the internal network 101b, the subscript "a" is appended to units connected to the external network 101a and the flow processing apparatuses 103 and service execution apparatuses 104 are distinguished individually.

In this example, it is assumed that the service execution apparatus 104a executes a service S1, the service execution apparatus 104b executes a service S2, and the service execution apparatus 104c executes a service S3.

Figure 2:
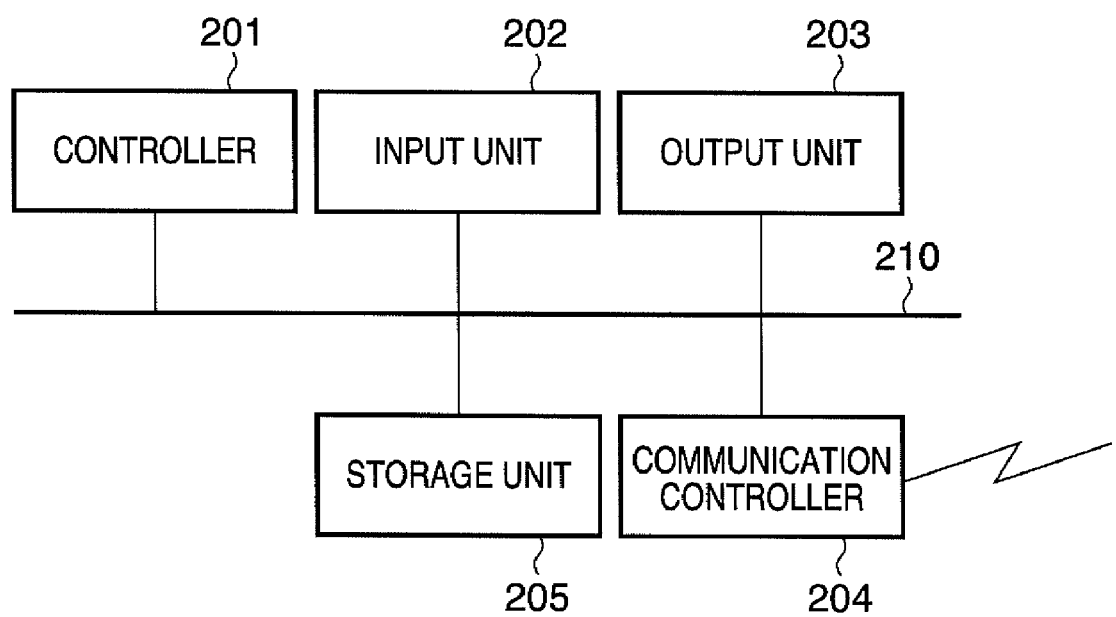
FIG. 2 is a block diagram illustrating an example of the structure of a flow processing apparatus.

FIG. 2 is a block diagram illustrating an example of the structure of the flow processing apparatuses 103a and 103b shown in FIG. 1. The flow processing apparatuses 103a and 103b will be referred to generically as a flow processing apparatus 103 below. In FIG. 2, a controller 201, which is constituted by a Central Processing Unit (CPU), a Read Only Memory (ROM), a Random Access Memory (RAM) and peripherals, controls the overall flow processing apparatus 103. An input unit 202, which includes an interface for connecting a keyboard and mouse, and the like, controls commands to the flow processing apparatus 103 and various inputs thereto. An output unit 203, which includes an interface for connecting a display, and the like, controls output of the status of the flow processing apparatus 103 and output of results of processing, and the like.

A communication controller 204, which includes an interface for communicating with the network, controls communication with the service execution apparatuses 104a, 104b and 104c. A storage unit 205 includes an interface that controls access to a large-capacity storage device (hard disk). A system bus 210 connects these components.

Next, reference will be made to FIG. 3 to describe a flow description document 301 interpreted and executed by the flow processing apparatus 103a. It should be noted that the flow description document may be stored in the storage unit 205, such as a hard disk, in the flow processing apparatus 103a, or may be placed in another device connected on the networks 101a, 101b.

Figure 3:
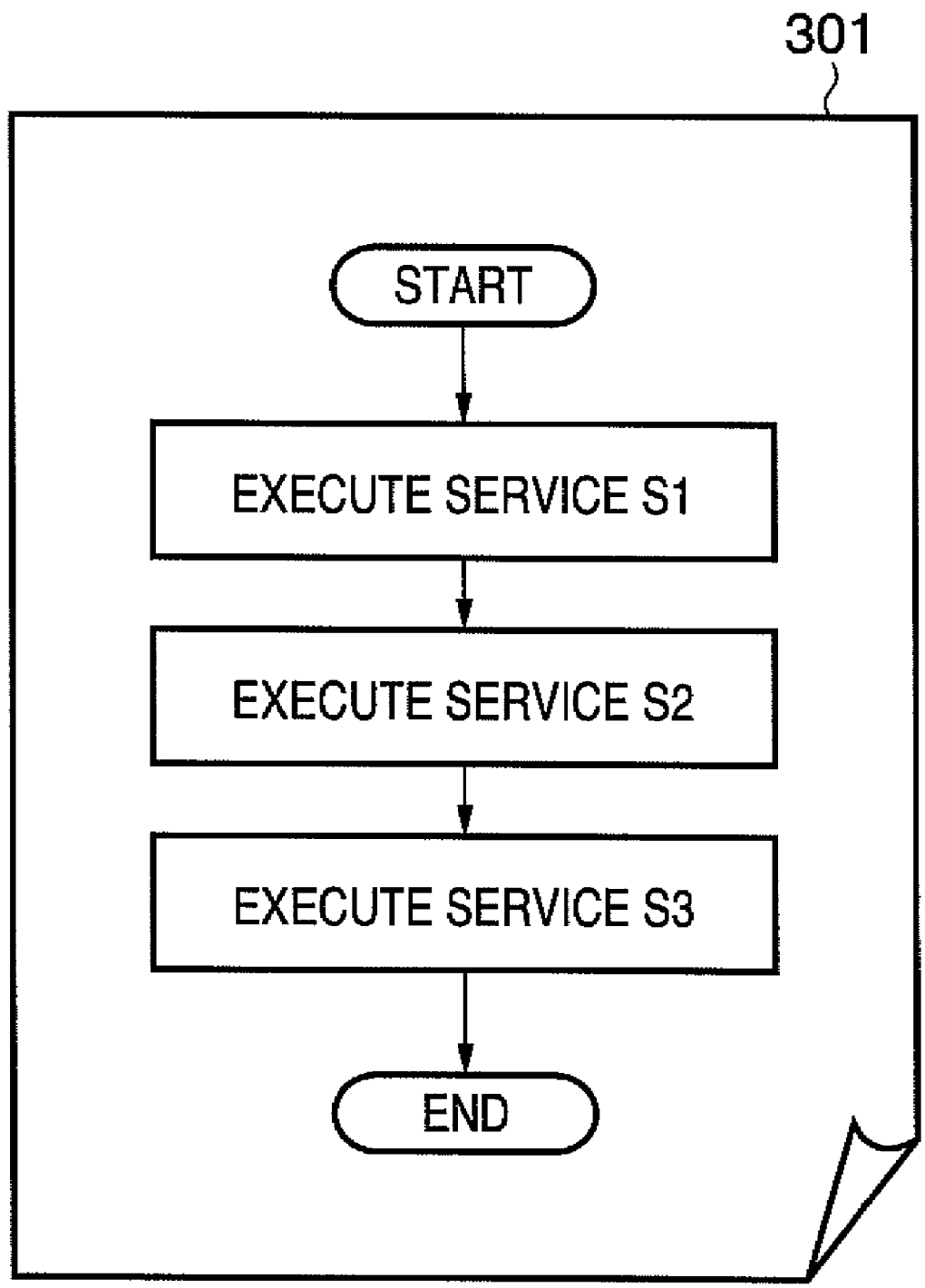
FIG. 3 is a diagram schematically illustrating an example of a flow description document in this embodiment.

FIG. 3 is a diagram schematically illustrating an example of the flow description document 301 in this embodiment. In the example illustrated in FIG. 3, the flow description document 301 describes a flow in which after the service S1 is executed, the service S2 is executed and then the service S3. The services S1 to S3 correspond to services executed by the service execution apparatuses 104a to 104c, respectively, illustrated in FIG. 1. Further, call-destination addresses of each of the services have been written in the services S1 to S3.

In general, with a firewall 102 of this kind, often communication from the external network 101a to the internal network 101b, which is communication to a specific port at a specific address with a specific protocol, is prohibited for combinations other than this combination. This means that with an ordinary setup, the flow processing apparatus 103a connected to the external network 101a cannot utilize a given service in the internal network 101b.

Accordingly, in order for the flow processing apparatus 103a to utilize a service in the internal network 101b, first the firewall 102 is separately configured. That is, the firewall 102 is set up separately in such a manner that the service execution apparatuses 104b and 104c in the internal network 101b can be utilized from the external network 101a.

This means that the firewall 102 is provided with through-ports the number of which is equal to the number of service execution apparatuses 104b, 104c in the internal network 101b, as a consequence of which the security of the internal network 101b is degraded significantly. Further, although there is no problem if all of the services to be utilized have been decided in advance, usually it is difficult for all of the services described in a flow description document to be decided beforehand.

Consequently, whenever a flow description document is described anew, it is necessary to configure the firewall 102 if use is made of the service execution apparatuses 104b, 104c belonging to the internal network 101b.

Figure 4:
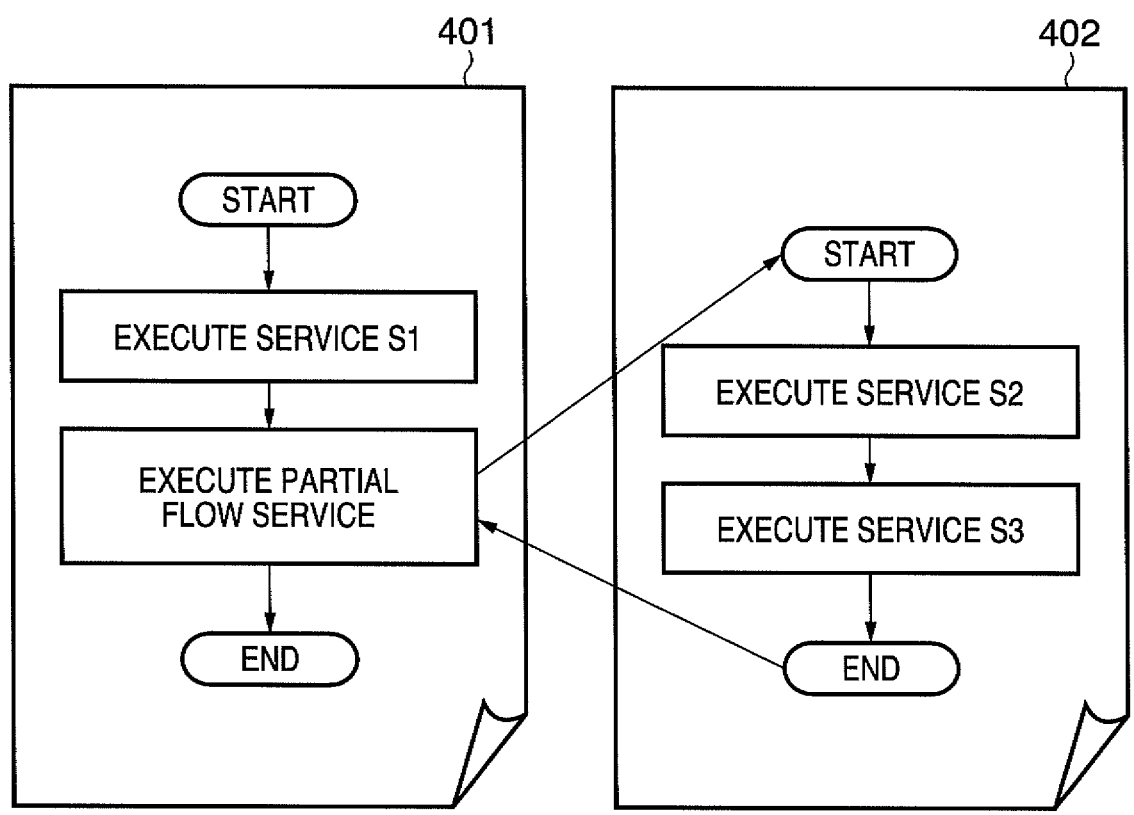
FIG. 4 is a diagram schematically illustrating an example of a case where the flow description document shown in FIG. 3 has been divided.

FIG. 4 is a diagram schematically illustrating an example of a case where the flow description document 301 shown in FIG. 3 has been divided. As illustrated in FIG. 4, first the services S2 and S3 executed on the side of the internal network 101b are described as a partial flow description document 402. A procedure for calling the services provided by the partial flow description document 402 are added to an overall flow description document 401 resulting from division.

Thus, according to this embodiment, the flow description document 301 is divided into the overall flow description document 401 and the partial flow description document 402. Further, only the procedure for calling the services provided in accordance with the partial flow description document 402 are described in the overall flow description document 401 resulting from division. A separate flow processing apparatus is instructed to carry out the actual execution of services.

Examples of the flow description document 301, overall flow description document 401 and partial flow description document 402 are illustrated in FIGS. 8, 9 and 10, respectively.

In the flow description document 301 of FIG. 8, invoke-2 and invoke-3 of invoke elements are transferred to the partial flow description document of FIG. 10. Therefore, invoke-2 and invoke-3 vanish from the overall flow description document of FIG. 9 and a new invoke element invokeSubProcess is inserted for calling the partial document. Further, invoke-2 and invoke-3, which were in the flow description document 301, are described in the partial flow description document (FIG. 10).

Next, reference will be made to FIGS. 5 and 6 to describe an execution designating method for designating execution of a service by a flow description diagram in the flow processing system.

Figure 5:
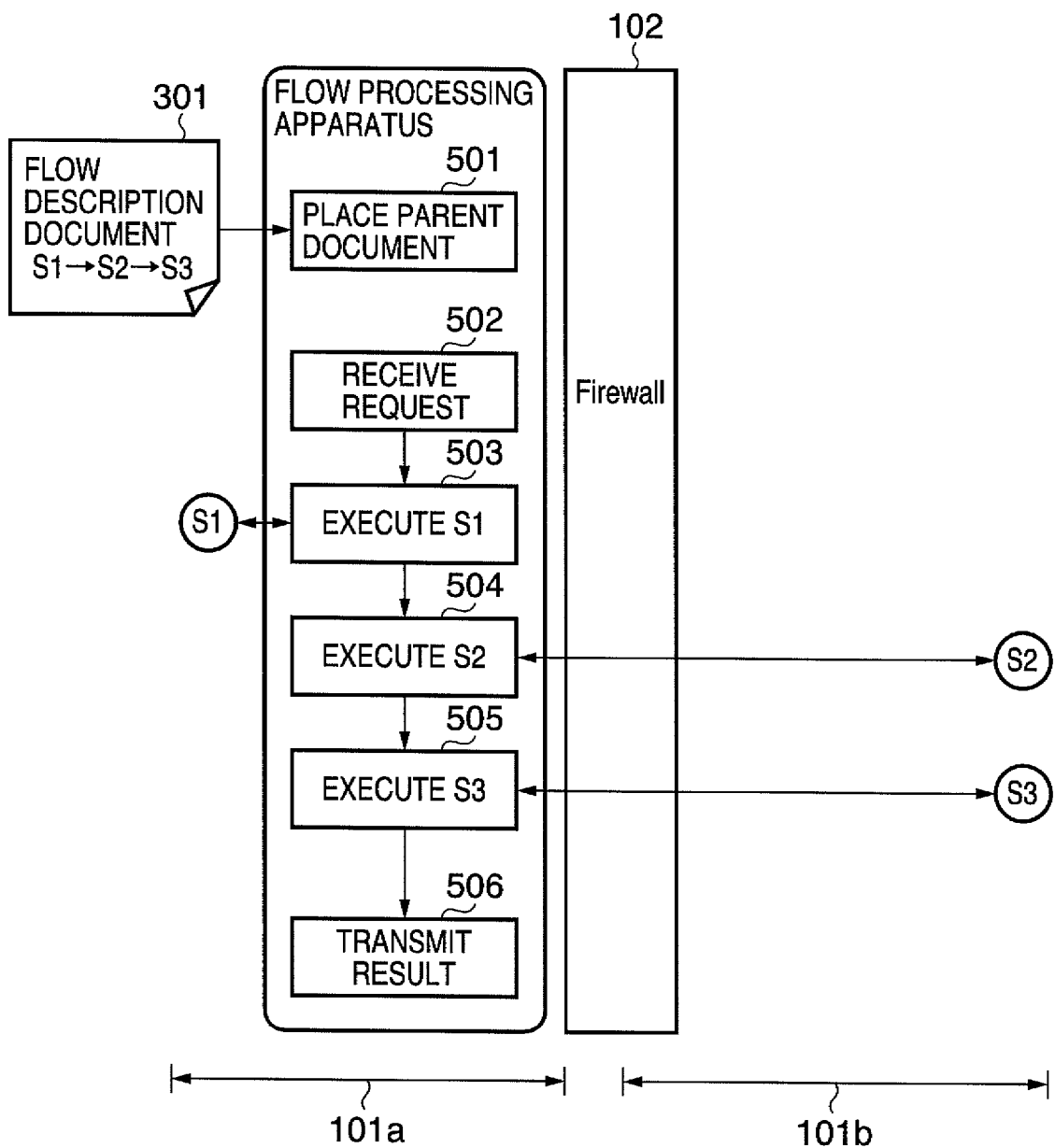
FIG. 5 is a schematic view illustrating a procedure for executing first flow processing.

FIG. 5 is a schematic view illustrating a procedure for executing first flow processing. First, the flow description document 301 is placed in the flow processing apparatus 103a beforehand at step 501. Next, when a request to execute flow processing described in the flow description document 301 is received at step 502, the flow processing apparatus 103a executes the service S1 on the network 101a at step 503. Next, at step 504, the flow processing apparatus 103a executes the service S2 within the firewall 102 and, similarly executes the service S3 within the firewall 102 at step 505. The flow processing apparatus 103a then transmits the result of execution at step 506 and terminates execution of this flow processing.

In order that the flow processing apparatus 103a may communicate with the interior of the firewall 102 at steps 504 and 505, an environment in which communication can be performed at steps 504 and 505 must be configured beforehand as the setup of the firewall 102.

Further, in this example, the settings for two services (S2 and S3) are made in the firewall 102. Whenever services belonging to the internal network are increased, as in the manner S4, S5, S6, . . . , it is necessary to modify settings to allow passage through the firewall 102.

Figure 6:
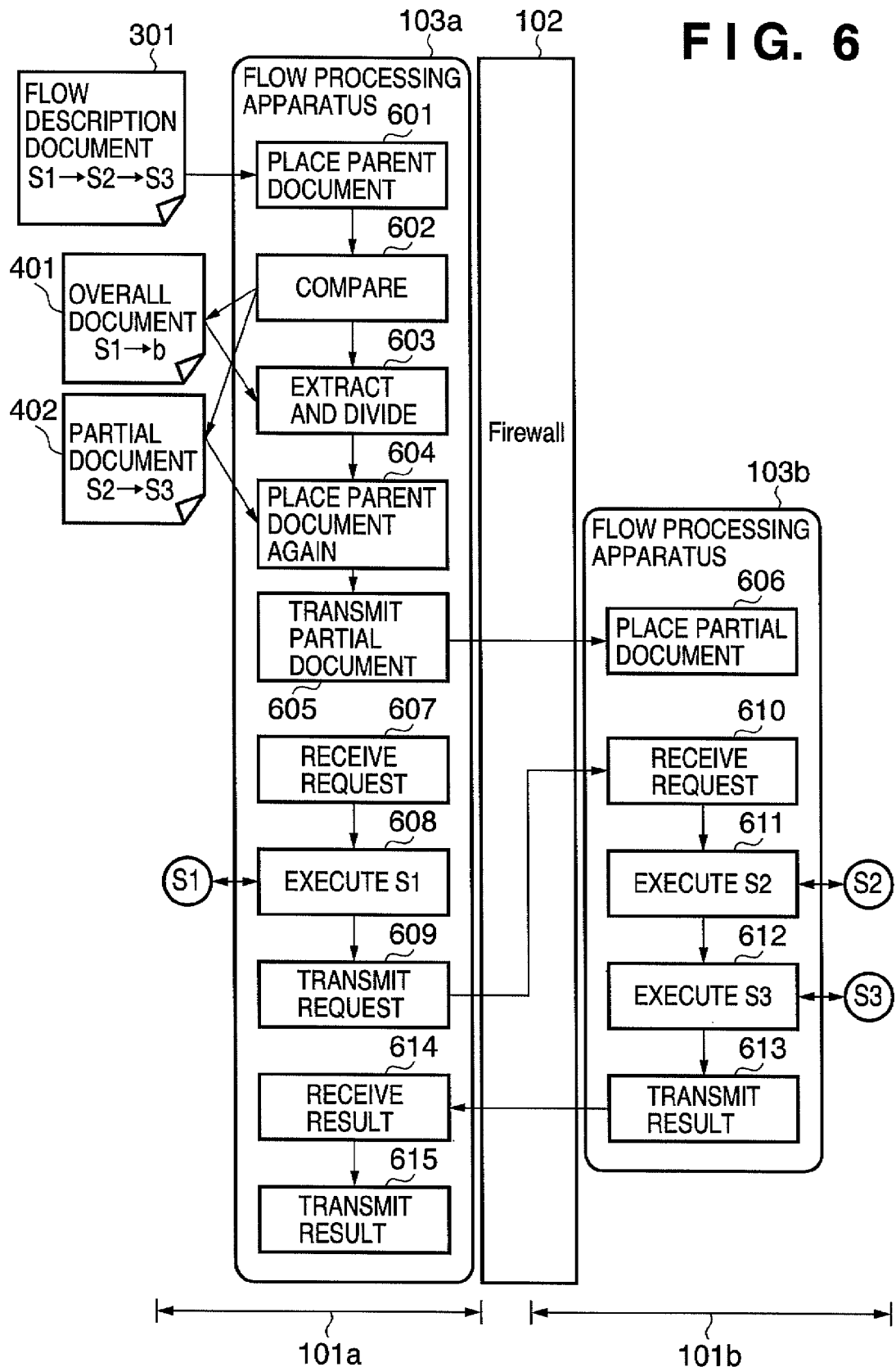
FIG. 6 is a schematic view illustrating a procedure for executing second flow processing.
Figure 7:
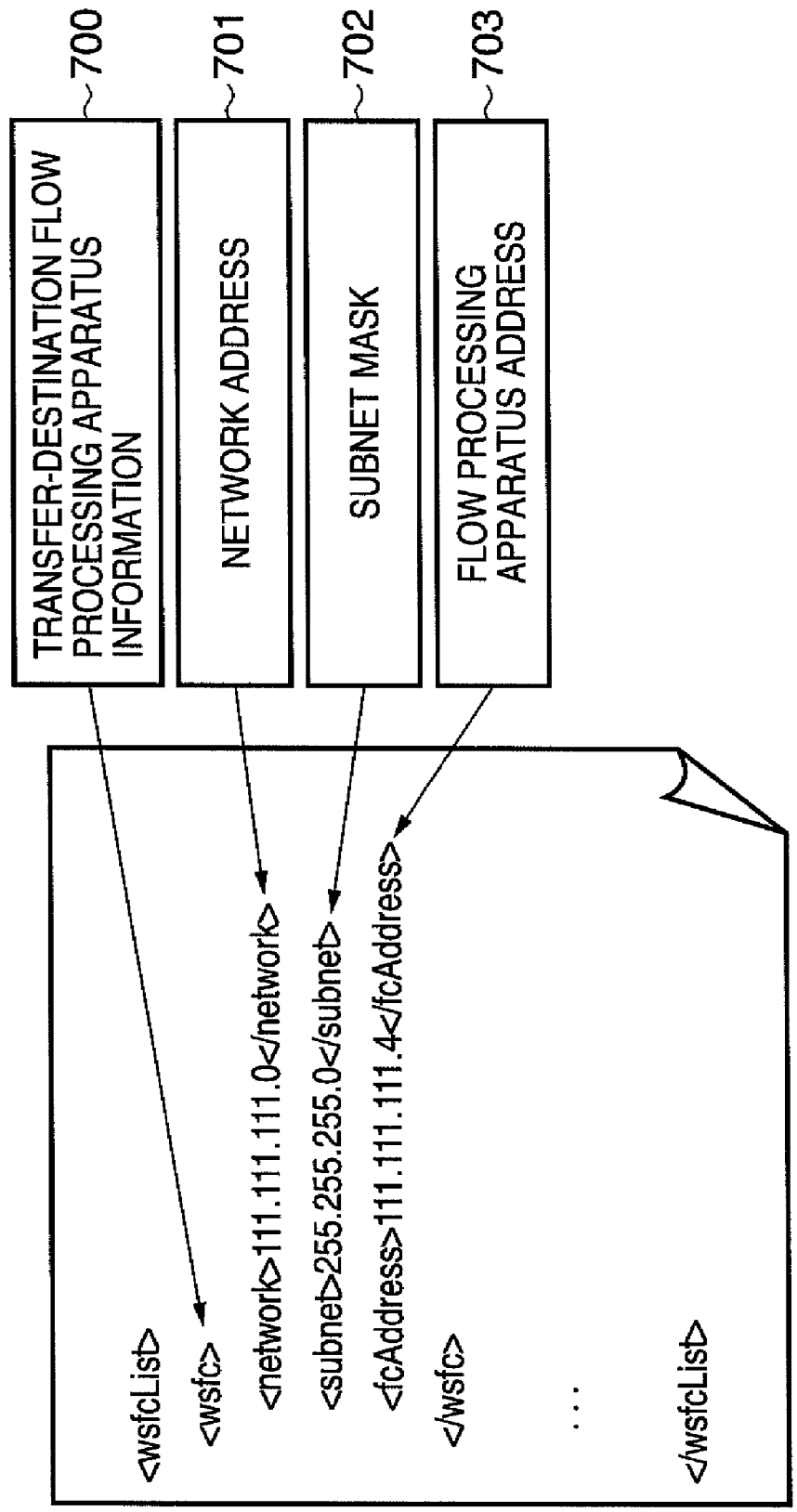
FIG. 7 is a diagram illustrating an example of the composition of transfer-destination flow processing apparatus information in this embodiment.

FIG. 6 is a schematic view illustrating a procedure for executing second flow processing. First, at step 601, when the flow description document 301 is placed in the flow processing apparatus 103a connected to the external network 101a of the firewall 102, it is compared, in step 602, with registered information. More specifically, information that has been registered in transfer-destination flow processing apparatus information 700 illustrated in FIG. 7 is compared with call-destination address information of a service described in the flow description document 301. The transfer-destination flow processing apparatus information 700 has been stored in the storage unit 205. It may be so arranged that the flow processing apparatus 103a makes reference to transfer-destination flow processing apparatus information 700 that has been stored in other devices connected to the networks 101a, 101b. The transfer-destination flow processing apparatus information 700 includes network address information 701, a subnet mask 702 and flow processing apparatus address information 703.

It is determined whether the call-destination address of the service that has been described in the flow description document 301 is included in the network that has been registered in the transfer-destination flow processing apparatus information 700. If the result of this determination is that the call-destination address of the service is included in the network (e.g., network 101b) decided by the network address information 701 and subnet mask 702 of the transfer-destination flow processing apparatus information 700, then this service is extracted and the partial flow description document 402 is created in step 603.

Further, the extracted service is deleted from the flow description document 301 and the overall flow description document 401, to which has been added the call description that includes the call-destination address for calling the partial flow description document 402, is created. This call-destination address is used by the flow processing apparatus 103a to call the transfer-destination flow processing apparatus. The transfer-destination flow processing apparatus called by this call-destination address executes the partial flow description document 402. Thereafter, in step 604, the overall flow description document 401 resulting from division is placed in the storage unit 205 of the flow processing apparatus 103a again.

Next, in step 605, the partial flow description document 402 is transmitted to the flow processing apparatus (transfer-destination flow processing apparatus) 103b, which has been determined from the network address information 701 and the subnet mask 702, via the network acquired in advance. The protocol for transmitting the partial flow description document 402 is SMTP. Further, the document may be transmitted to a specific port at a specific address by Hypertext Transfer Protocol (HTTP). The address information 703 of this flow processing apparatus 103b has been stored in correspondence with the network address information 701 and subnet mask 702. On the other hand, when the flow processing apparatus 103b receives the partial flow description document 402 from the flow processing apparatus 103a, it places this partial flow description document 402 in the storage unit 205 at step 606. It should be noted that it may be so arranged that the overall flow description document 401 and partial flow description document 402 are generated by an apparatus other than the flow processing apparatus 103a and placed in the flow processing apparatuses 103a, 103b.

Next, in step 607, when a request for actually calling a flow is received, the flow processing apparatus 103a executes the service S1, which is described in the overall flow description document 401, in step 608. This request is received from within the network 101a. Further, the request may be received from the input unit 202 of the flow processing apparatus 103a. In order to execute the service S1, the flow processing apparatus 103a calls the service execution apparatus 104a. The protocol for calling the service execution apparatus 104a is HTTP.

Next, utilizing the port and address that have been acquired beforehand by the setup of the firewall 102, the flow processing apparatus 103a transmits a request, which calls the flow processing apparatus 103b connected to the internal network 101b of the firewall 102, in step 609. The destination of the transmission of this request is a call-destination address, which is for calling the partial flow description document 402, described in the overall flow description document 401. The protocol for transmitting this request is SMTP. Further, the request may be transmitted to a specific port at a specific address by HTTP.

On the other hand, when the flow processing apparatus 103b receives the request in step 610, it executes the service in accordance with the flow processing described in the partial flow description document 402 placed in step 606 above. First, in step 611, the flow processing apparatus 103b calls the service execution apparatus 104b and causes it to execute the service S1. Then, in step 612, the flow processing apparatus 103b calls the service execution apparatus 104c and causes it to execute the service S3. The protocol for calling the service execution apparatuses 104b and 104c is HTTP. When execution of the services S2, S3 ends, the flow processing apparatus 103b transmits the results of executing each of the services to the flow processing apparatus 103a. The protocol for transmitting the results of execution is HTTP.

As a result, upon receiving the results of executing the services S2, S3 in step 614, the flow processing apparatus 103a transmits the results of the services S2, S3 along with the result of service S1 to the request destination as the overall result in step 615. The request destination exists in the network 103a. In a case where the flow processing apparatus 103a itself is the request destination, the results of the services are output to the output unit 203.

In accordance with this embodiment, even in a case where communication is held to communication between flow processing apparatuses and there is an increase in called services or a change in service calling points, the settings prevailing at the time the system is deployed can be utilized as is and no burden is imposed at the time of operation. Further, from the standpoint of security, since communication is only communication between nodes that have been determined, it is no longer necessary to create pass-through ports in a firewall whenever a service is added on and, hence, a decline is security can be avoided.

The object of the invention is also attained by supplying a recording medium storing the program codes of the software for performing the functions of the foregoing embodiment to a system or an apparatus, reading the program codes, which have been stored on the recording medium, with a computer (e.g., a CPU or Micro-Processing Unit (MPU)) of the system or apparatus from the storage medium, and then executing the program codes.

In this case, the program codes per se read from the recording medium implement the functions of the embodiment and the recording medium storing the program codes constitutes the invention.

Examples of recording media that can be used for supplying the program code are a flexible disk, hard disk, optical disk, magneto-optical disk, Compact Disc Read Only Memory (CD-ROM), Compact Disc Recordable (CD-R), magnetic tape, non-volatile type memory card or ROM, etc.

Further, not only are the functions of the above-described embodiment implemented by executing a program read that has been read by a computer; the following case is included as well: specifically, an operating system or the like running on the computer executes some or all of the actual processing based upon the indications in the program codes, and the functions of the above-described embodiment are implemented by this processing.

Furthermore, the following case also is included in the present invention. Specifically, program code read from recording medium is written to a memory provided on a function expansion board inserted into the computer or provided in a function expansion unit connected to the computer. Thereafter, a CPU or the like provided on the function expansion board or function expansion unit performs some or all of actual processing based upon the indication in the program codes, and the functions of the above embodiment are implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-041278, filed Feb. 21, 2007 and No. 2008-019588, filed Jan. 30, 2008, which are hereby incorporated by reference herein in their entirety.

What is claimed is:

1. A method of controlling Web services from a first apparatus on a first network, the method comprising:
    determining, by the first apparatus, whether an instruction in a first structured document, for Web services, comprises a remote procedure call to at least one Web service provided on a second network, wherein the at least one Web service provided on the second network is accessible from a second apparatus that forwards a procedure call to a third apparatus on the second network that is responsible for handling the procedure call;
    generating second and third structured documents from the first structured document, wherein the second structured document is generated by a process comprising replacing the remote procedure call to the at least one Web service provided on the second network with a call to execute the third structured document, and wherein the third structured document comprises the instruction in the first structured document for the remote procedure call to the at least one Web service provided on the second network;
    registering the second structured document in the first apparatus on the first network;
    registering the third structured document in the second apparatus on the second network;
    calling, from the first apparatus, the second apparatus in accordance with the call, in the second structured document, to execute the third structured document; and
    receiving, at the first apparatus, a processing result of the third structured document having been processed by the second apparatus by calling the third apparatus on the second network responsible for handling the at least one Web service provided on the second network in accordance with the instruction in the third structured document.

2. The method according to claim 1, wherein in the generating step, the second and third structured documents are generated based on a network address of the third apparatus that provides the at least one Web service on the second network.

3. The method according to claim 1, wherein the generating step is executed by the first apparatus.

4. The method according to claim 1, wherein the second network is an internal network of a firewall, and the first network an external network of the firewall.

5. A flow processing apparatus on a first network, comprising:
    a determination unit configured to determine whether an instruction in a first structured document, for Web services, comprises a remote procedure call to at least one Web provided on a second network, wherein the at least one Web service provided on the second network is accessible from a second apparatus that forwards a procedure call to a third apparatus on the second network that is responsible for handling the procedure call;
    a generation unit configured to generate second and third structured documents from the first structured document, wherein the second structured document is generated by a process comprising replacing the remote procedure call to the at least one Web service provided on the second network with a call to execute the third structured document, and wherein the third structured document comprises the instruction in the first structured document for the remote procedure call to the at least one Web service provided on the second network;
    a registration unit configured to register the third structured document in the second apparatus on the second network;
    a calling unit configured to call the second apparatus in accordance with the call, in the second structured document, to execute the third structured document; and
    a reception unit configured to receive a processing result of the third structured document having been processed by the second apparatus by calling the third apparatus on the second network responsible for handling the at least one Web service provided on the second network in accordance with the instruction in the third structured document.

6. The apparatus according to claim 5, wherein the generation unit generates the second and third structured documents based upon a network address of the third apparatus that provides the at least one Web service on the second network.

7. The apparatus according to claim 5, wherein the second network is an internal network of a firewall, and the first network is an external network of the firewall.

8. A non-transitory storage medium storing a computer program executed by a computer in a first network, the computer program comprising the steps of:
    determining whether an instruction in a first structured document, for Web services, comprises a remote procedure call to at least one Web service provided on a second network, wherein the at least one Web service provided on the second network is accessible from a second apparatus that forwards a procedure call to a third apparatus on the second network that is responsible for handling the procedure call;

generating second and third structured documents from the first structured document, wherein the second structured document is generated by a process comprising replacing the remote procedure call to the at least one Web service provided on the second network with a call to execute the third structured document, and wherein the third structured document comprises the instruction in the first structured document for the remote procedure call to the at least one Web service provided on the second network;

registering the third structured document in the second apparatus on the second network;

calling the second apparatus in accordance with the call, in the second structured document, to execute the third structured document; and receiving a processing result of the third structured document having been processed by the second apparatus by calling the third apparatus on the second network responsible for handling the at least one Web service provided on the second network in accordance with the instruction in the third structured document.

9. The storage medium according to claim 8, wherein at said generating step, the second and third structured documents are generated based upon a network address of the third apparatus that executes the at least one Web service on the second network.

10. The storage medium according to claim 8, wherein the second network is an internal network of a firewall, and the first network is an external network of the firewall.

* * * * *